United States Patent [19]
Wittstock

[11] 4,161,808
[45] Jul. 24, 1979

[54] MACHINE FOR CUTTING CONTINUOUS SHEET MATERIAL

[75] Inventor: Gerhard Wittstock, Pinneberg, Fed. Rep. of Germany

[73] Assignee: Werner H.K. Peters Maschinenfabrik G.m.b.H., Hamburg, Fed. Rep. of Germany

[21] Appl. No.: 905,357

[22] Filed: May 12, 1978

[30] Foreign Application Priority Data

May 17, 1977 [DE] Fed. Rep. of Germany ....... 2722233

[51] Int. Cl.² .................. B23P 23/00; B23D 19/00
[52] U.S. Cl. .................................. 29/33 R; 83/479; 219/121 L
[58] Field of Search ............. 83/479; 29/33 R; 219/121 L

[56] References Cited

U.S. PATENT DOCUMENTS

| | | | |
|---|---|---|---|
| 3,408,886 | 11/1968 | David | 83/479 X |
| 3,679,117 | 7/1972 | Moss | 83/479 X |
| 3,831,929 | 8/1974 | Hellmer | 83/479 X |
| 3,961,547 | 6/1976 | Shainberg et al. | 83/479 X |

FOREIGN PATENT DOCUMENTS

| | | | |
|---|---|---|---|
| 285592 | 7/1915 | Fed. Rep. of Germany | 83/479 |
| 2306296 | 9/1973 | Fed. Rep. of Germany | 83/479 |

*Primary Examiner*—William R. Briggs
*Attorney, Agent, or Firm*—Andrus, Sceales, Starke & Sawall

[57] ABSTRACT

A machine for longitudinally cutting and/or grooving continuous sheet material comprises first and second stations each of which has means for cutting and/or grooving the sheet material, the stations being spaced apart longitudinally in a direction along which the sheet material is fed through the machine, the sheet material first passing the first station and then the second station. The stations are upwardly and downwardly movable between working and inoperative positions, and a device for cutting the continuous sheet material transversely into sections is also provided. The working positions of the two stations are in a common plane along which, in operation, the sheet material is fed and each of the stations has a first guide device for guiding the sheet material, the first guide device of each station being disposed on one side of the common plane when the station is in its working position. The second guide device is mounted on the other side of the common plane between the two stations and is directed towards the cutting and/or grooving means of the second station both when the second station is in its working position and in its inoperative position, and a third guide device is mounted on the other side of the common plane between the two stations and is directed towards the cutting and/or grooving means of the first station also both when the first station is in its working position and in its inoperative position.

26 Claims, 9 Drawing Figures

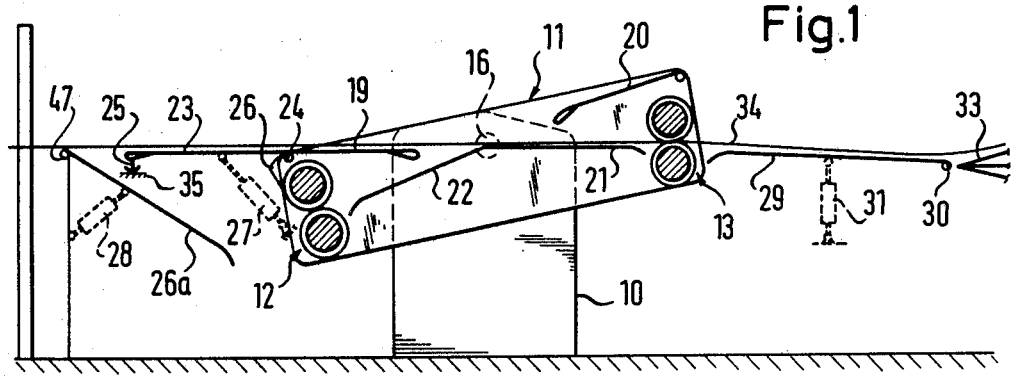
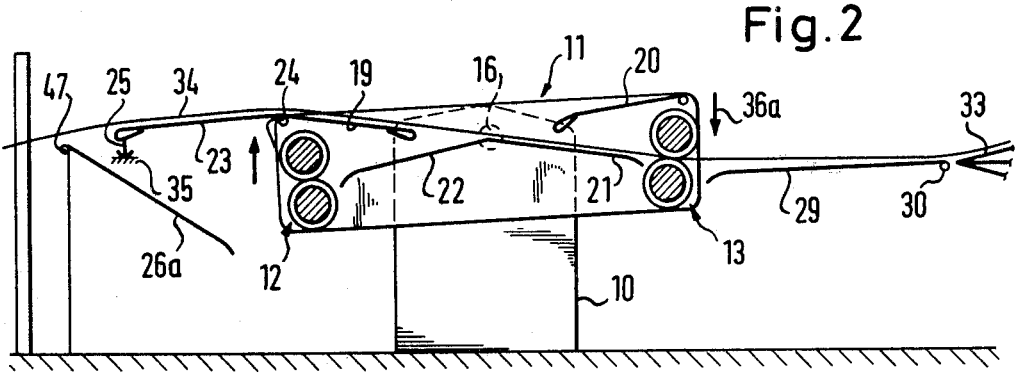
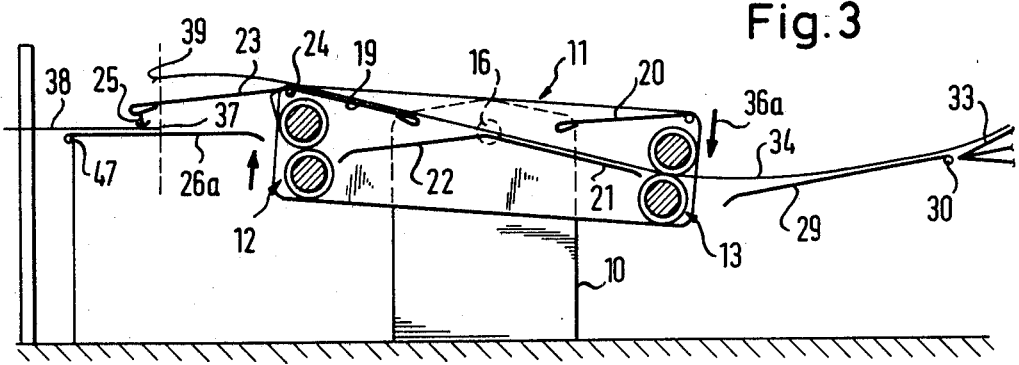

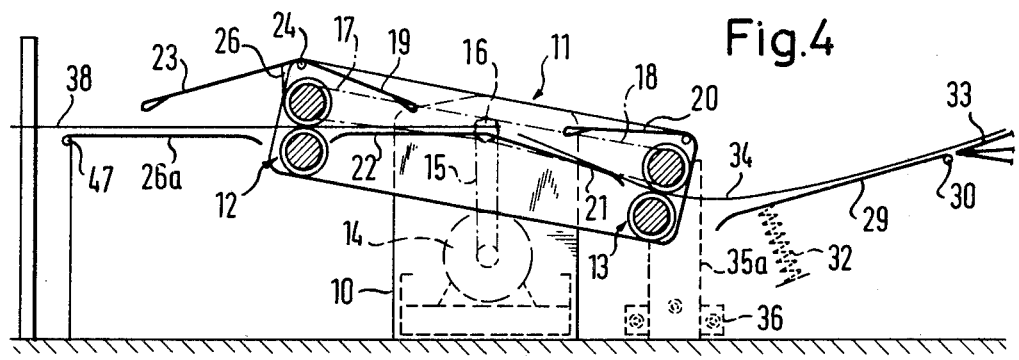
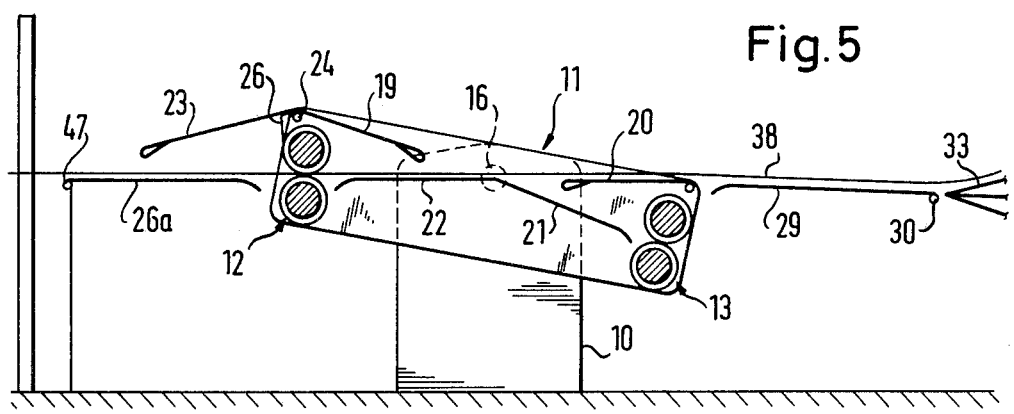
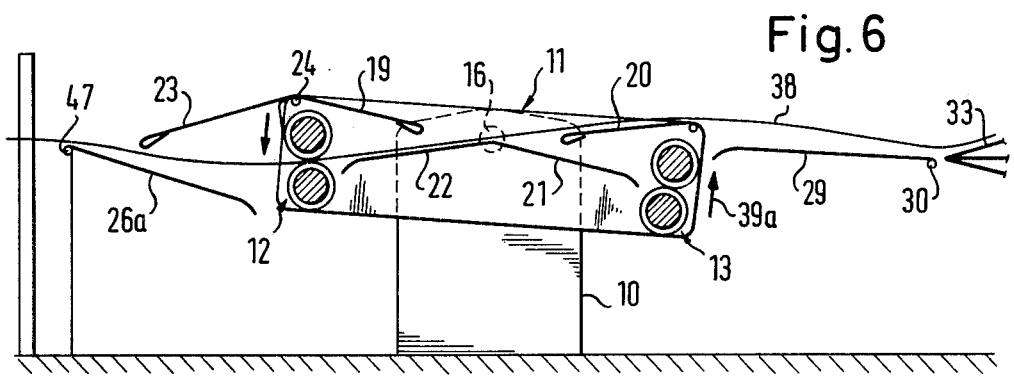

MACHINE FOR CUTTING CONTINUOUS SHEET MATERIAL

This invention relates to machines for longitudinally cutting and/or longitudinally grooving continuous sheet material, for example corrugated cardboard, the machine comprising two upwardly and downwardly movable longitudinal cutting and/or grooving stations, to which the sheet material is fed via guide means, and a device for cutting the continuous sheet material transversely into sections. In operation of such machines, one station is situated in a working plane in which the sheet material is guided, while the other station or stations are situated outside the working plane in inoperative positions so that they can be set to a new format of longitudinal cuts and/or grooves. A disadvantage in these known machines is that they cannot ensure so-called continuous operation. That is to say they cannot cause a new section of sheet to follow at the same speed a section cut off by the transverse cutter and feed it to another, previously adjusted, cutting and grooving station. Instead, a slowing-down or indeed complete stopping of the new section of sheet is necessary until the cutting and grooving device which is to become operative has been brought into its working position. Another possibility consists of cutting away a predetermined number of intermediate sections as the material sheet continues to be fed through the machine at its normal production speed, until the leading end can be introduced into the new cutting and grooving station.

A machine for longitudinal cutting and grooving of continuous sheet material has also been disclosed, wherein the sheet material can still be continuously moved forward when the format is changed. This result is achieved by the fact that two longitudinal cutting and grooving stations are disposed one above another. The leading edge of the sheet material cut off by the transverse cutter is supplied as desired from one guide device to either one of the stations (DT-AS 2,306,296). The cutting and grooving stations are guided within frames disposed in a rectangle and are brought into inoperative positions from their relevant working positions for the purpose of changing the format, in order that the necessary modifications to, or alterations in the positions of, the cutting and grooving tools can be carried out.

This known machine also has some disadvantages. Since each cutting and grooving station has its own working plane, the sheet material is deflected to a greater or lesser extent according to the station to which it is fed and this can lead to unsatisfactory stressing of the material during the production operation. Moreover, it is extraordinarily difficult to carry out a change of format at full production speed without wastage of the sheet material. In such a case, the change-over guide apparatus must be operated exactly at the instant at which the trailing end of the cut-off sheet has just left it and the leading end of the new section of sheet has not yet reached the guide of the previously operating cutting and grooving station. Any deviation from this instant leads to a discontinuous change-over. Finally, a disadvantage is the relatively bad accessibility of the apparatus, particularly when the sheet material jams in the guides.

The object of the present invention is to provide a machine for longitudinally cutting and/or grooving continuous sheet materials, for example corrugated cardboard, which makes a continuous production possible without wastage when the format is changed.

To this end, according to this invention, such a machine comprises first and second stations each having means for cutting and/or grooving the sheet material, the stations being spaced apart longitudinally in a direction along which the sheet material is fed through the machine, the sheet material first passing the first station and then the second station, the stations being upwardly and downwardly movable between working and inoperative positions, and a device for cutting the continuous sheet material transversely into sections, wherein the working positions of the two stations are in a common plane along which, in operation, the sheet material is fed, each of the stations has a first guide device for guiding the sheet material, the first guide device of each station being disposed on one side of the common plane when the station is in its working position, a second guide device is mounted between the two stations and is directed towards the cutting and/or grooving means of the second station both when the second station is in its working position and in its inoperative position, and a third guide device is mounted between the two stations and is directed towards the cutting and/or grooving means of the first station, both when the first station is in its working position and in its inoperative position.

The machine in accordance with the present invention goes back once again to the principle of conventional longitudinal cutting and grooving machines, wherein the cutting and grooving station which is presently in operation always operates in the same working plane. As a result, very favourable material stressing conditions occur during production because there is little deflection. It has now been appreciated that the conventional longitudinal cutting and grooving machine will make a continuous production run possible if guide devices are coupled in a suitable manner with the cutting and grooving stations, these guide devices ensuring a continuous transition from station to another and hence from one format to another. That is to say, that while the remainder of the cut-off sheet material is still in one cutting and grooving station which has hitherto been in operation, this station is already moving into its inoperative position. In this way, the remaining portion of the sheet material is slightly deflected. Material stresses are however at a minimum because the trailing end of this remaining section is free, and while the cutting and grooving station which previously was in operation is moving into its inoperative position, the other longitudinal cutting and grooving station, which is coupled to the first station is moved into its working position and can receive the leading end of the new section of sheet material following a transverse cut.

Since, with the machine in accordance with this invention, when a format is changed, the trailing end of the forward section of sheet is moved out of the working plane, no problems at all arise for the guiding of the leading end of the new section of sheet material. It is therefore more simple to provide an exact instant for the change-over. It is moreover not necessary, during the change-over operation, to cut away a length of sheet material, so that when a change of format takes place there is no wastage and very high productivity is achieved.

In the machine in accordance with this invention, the cutting and grooving stations are movable upwards and downwards and are coupled together in such a manner that one cutting and grooving station moves into its working position while the other moves into its inoperative position and vice versa. Correspondingly, the guide of the cutting and grooving station in its inoperative position then raises or lowers the corresponding region of the sheet material, in order to make room for the new section of sheet when the format is changed. Since the cutting and grooving stations are spaced apart longitudinally and are movable only upwards and downwards, an extraordinarility good accessibility to the individual stations for the purpose of changing the format is possible. Moreover, the machine in accordance with the present invention can be incorporated into any existing corrugated cardboard or other continuous sheet material production plant.

When the first longitudinal cutting and grooving station is in its inoperative position, the sheet is conducted above or below this station and is processed by the second cutting and grooving station. In order that the leading end of the separated new section of sheet shall now be introduced into the guide device above or below the first cutting and grooving station, a further preferred feature of the invention provides that a height-adjustable fourth guide device is mounted upstream in the direction in which the sheet material is fed through the machine, of the first station and is coupled to the first station, the fourth guide device being situated in the common plane when the first station is in its inoperative position. If the first cutting and grooving station is in its working position, then the fourth guide device is moved by this station out of the common working plane. During the movement of the first station into its inoperative position, the fourth guide device moves towards the common working plane, in order to receive the new section of sheet which is continuously fed forwards in the same plane, and to guide it via the guide devices disposed between the cutting and grooving stations towards the second cutting and grooving station.

If the first cutting and grooving station is situated in its working position, it is advantageous to provide a suitable guide device, by which the sheet material is conducted into the first cutting and grooving station. In this connection, a further preferred feature of the invention provides that an adjustable, fifth guide device is mounted upstream of the first station, the fifth guide device being disposed in the common plane when the first station is in its working position. At the instant at which the first cutting and grooving station moves out of its working position into its inoperative position, the fifth guide device is also moved out of the common plane, in order to provide room for the fourth guide device, which is now approaching the common plane. In an advantageous manner, the fourth and fifth guide devices are disposed partly overlapping one another, in the direction in which the sheet material is fed through the machine.

In order that, during normal operation and during a change-over format, the sheet material is adequately guided between the cutting and grooving stations, care must be taken to ensure that the associated guide devices are continually aligned with one another and to the associated cutting and grooving stations. This can be achieved especially simply by the fact that, according to a further preferred feature of this invention, the two stations are mounted at the ends of a two-armed lever assembly which is pivotally mounted substantially at its centre, and the first to third guide devices are fixed to the lever assembly. With this arrangement, the cutting and grooving stations are mounted in a kind of rocker, which on account of the balance of mass existing can be comparatively rapidly moved by means of a suitable moving device, in order to rock the cutting and grooving stations into their working positions or their inoperative positions. The guiding devices which are disposed between the stations are thus automatically swung at the same time as each other and always remain aligned with one another, so that additional devices for actuating these guide devices are not necessary.

According to a further preferred feature of the invention, the fourth guide device is pivotally attached to the lever assembly, a first stop being preferably provided to limit the pivoting movement of the fourth guide device towards the lever assembly, while a second stop supports the free end of the guide device in its working position. The fourth guide device, which for example may be in the form of a flap, is brought into its correct working position automatically with the pivoting of the lever assembly. The appropriate stops promote the required self-regulating action.

The fifth guide device is, according to a further preferred feature of this invention, pivotally mounted to move between a working position situated in the common plane and a downwardly swung position. This device can also be formed as a control flap, which is pivotally mounted at one end and is made adjustable by means of a suitable actuating device. Its adjustment is with advantage carried out more rapidly than the movement of the cutting and grooving stations between their working and inoperative positions, in order to ensure as far as possible an uninterrupted transition of the sections of sheet material when the format is changed. In this connection, a further preferred feature of the invention provides that the forth guide device rests slidably upon the fifth guide device which is disposed beneath the fourth guide device in the region between the first and second stops when the fifth guide device is in its working position. In this manner, a coupling between the fourth and fifth guide devices is obtained, in so far as the position of the fourth guide device is partially determined by the fifth guide device. In this way, a separate drive for the fourth guide device becomes unnecessary. Alternatively, however, a drive for the fourth guide device may be provided.

In the machine in accordance with the present invention, the cutting and grooving stations are each movable upwards and downwards between upper and lower positions. Basically, it is possible for the working position to be either the upper or the lower position. Preferably, however, it is advantageous for the working positions of the longitudinal cutting and grooving stations to be situated above the inoperative positions. This makes the deflecting away of the material sheet more simple. A further advantage also results in the use of automatic programme change devices, into which the cutting and grooving stations automatically move, when they move from their working positions into their inoperative positions below. In corrugated paper production plants, the longitudinally cut and grooved material sheet is usually supplied to a transverse cutting device, which may consist of a plurality of transverse cutters disposed one above another. The deflection of the sheet material to the desired transverse cutter can be effected by means of a known "paddle control", i.e., by means of a control flap which guides the sheet material to the desired transverse cutter. Since in the machine in accordance with the present invention, a slight deflection of the sheet material occurs during the change of format, the control flap assembly cannot be disposed directly adjacent to the second cutting and grooving station, but instead, according to a further feature of this invention, an adjustable, sixth guide device is disposed downstream of the second station. This ensures a guided transition of the sheet material from the first longitudinal cutting and grooving station to the control flap assembly.

The drive for the tools of the cutting and grooving stations can, in the machine in accordance with this invention, be of any known type or arrangement. It is particularly advantageous, however, if one drive motor is provided for each station and this drive is preferably a direct current motor. The direct current motor makes possible, in an advantageous manner, regulation of the working speed of the tools to adapt the speed to the particular operating conditions. An advantage of a common drive motor, however, is that the cutting and grooving tools for one station may be disposed upon a common shaft. The construction is accordingly less complicated. In addition, due to the smaller mass, a more rapid movement of the cutting and grooving stations can be attained. It has been found that with the arranging of corresponding cutting and grooving tools upon a common shaft equally good results can be obtained. The drive for the cutting and grooving stations in the machine in accordance with this invention can be realised especially simply with the lever assembly arrangement if provision is made for a drive transmission between the drive motor and the shafts to be provided and for a change of direction of the drive to take place through change of direction wheels having an axis of rotation coinciding with the pivoting axis of the lever assembly. The drive motor can then be stationarily mounted and does not need to move with the lever assembly. By arranging an axis of rotation of the change of direction wheels on the pivoting axis, an extremely simple drive transmission is moreover produced.

It is especially advantageous if the cutting and grooving tools of each station are mounted on a common shaft by quick-release devices. In this way, the cutting and grooving station situated in its inoperative position can be reprogrammed for a new format in an extremely short time.

As already mentioned, in the machine in accordance with this invention, a change of format is possible without changing the feeding speed of the sheet material and without wastage occurring. In order to simplify the change-over, a further preferred feature of the invention provides that the distance between the transverse cutting device and the first station is sufficiently large for the sheet material to travel this distance at the speed at which the material is fed through the machine within the time necessary for the first station to move from its inoperative position to its working position. In the machine in accordance with the present invention, thus, the change-over operation commences immediately after cutting by the transverse cutting device, so that a sufficient time remains even for relatively large masses to move through the required distance, in this case for a cutting and grooving station to move from its working position into its inoperative position and vice versa.

In conjunction with cutting and grooving devices in corrugated cardboard production plants, edge cutting devices are also used, for trimming the sheet material. In this connection, a further feature of the invention provides that an independent edge cutting device is disposed upstream of the first longitudinal cutting and grooving station and is preferably formed as a laser or water-jet cutting device and a suction extraction device is associated with the edge cutting device.

An example of a machine in accordance with the invention is illustrated in the accompanying diagrammatic drawings in which:

FIGS. 1 to 8 are all similar side views of the machine but shown at different stages of its operation.

FIG. 1 shows the machine with the cutting and grooving station in the inoperative position and the second station in the working position;

FIG. 2 shows the first cutting and grooving station moving towards the working position and the second station moving towards the inoperative position;

FIG. 3 shows the first cutting and grooving station immediately before it reaches the working position and the second station immediately before it reaches the inoperative position;

FIG. 4 shows the first cutting and grooving station in the working position and the second station in the inoperative position;

FIG. 5 shows the cutting and grooving stations in the same positions as in FIG. 4 but after a change of format has been completed;

FIG. 6 shows the adjustment of the first cutting and grooving station towards the inoperative position and of the second station towards the working position;

FIG. 7 shows the first cutting and grooving station immediately before it reaches the inoperative position and the second station immediately before it reaches the working position; and FIG. 8 shows the first cutting and grooving station in the inoperative position and the second station in the working position, but before the change of format has been completed.

Figure 7:
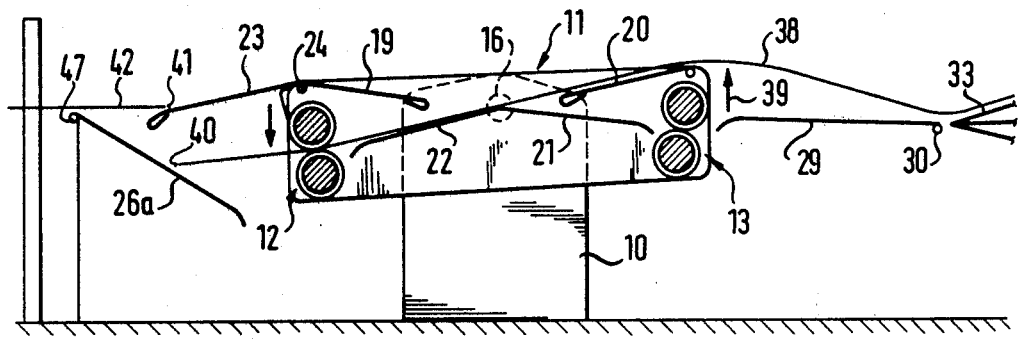

A two-armed lever assembly 11 is pivotally mounted between two spaced apart frames, of which one is shown at 10. The lever assembly 11, which is supported approximately in the middle, is shown only diagrammatically and it includes for example a suitable frame. It is rocked by a hydraulic, pneumatic or electrical drive, not shown, and carries at its first end, that is the left hand end as seen in the drawings and is the end first reached by the sheet to be processed, which moves through the machine from left to right as seen in the drawings, a cutting and grooving station 12 and at its second end, that is the right hand end as seen in the drawings, a cutting and grooving station 13. The cutting and grooving stations 12, 13 comprise pairs of shafts, which carry both cutting and grooving tools. The cutting and grooving stations 12, 13 are each driven by a direct current motor 14 (see FIG. 4) which is connected by a first transmission 15 to change of direction wheels, not shown, an axis of rotation of which coincides with an axis of rotation 16 of the lever assembly 11. The cutting and grooving stations 12, 13 are driven through further transmissions 17, 18 respectively. The speed of rotation of the cutting and grooving tools can be varied by means of the direct current motor 14, so that the desired peripheral speed of the tools faster than the sheet to be processed can be achieved.

Two first guide plates 19, 20 are firmly connected to the lever assembly 11 above the cutting and grooving stations 12, 13 respectively. A second guide plate 21 is firmly mounted in the lever assembly 11 and is directed towards the gap of the cutting and grooving station 13, while a third guide plate 22 is likewise firmly mounted inside the lever assembly 11 and is directed towards the gap of the cutting and grooving station 12. A control flap 23 is pivotally attached at 24 to the lever assembly 11. The flap 24 has, at its left hand end, a stop device 25, and co-operates with a stop 26 fixed on the lever assembly 11. In addition, an adjusting cylinder 27 shown in dotted lines can optionally be provided in order to set the control flap 23 relative to the lever assembly 11. The control flap 23 extends above a further control flap 26a, which is pivotally mounted about a stationary pivot axis 47 at a distance from the control flap 23 and can be adjusted in angular position by means of an adjusting cylinder 28 shown in dotted lines in FIG. 1.

A further control flap 29 is disposed behind the second cutting and grooving station 13 and pivotally mounted at 30 about a stationary, horizontal pivot axis. It can be pivoted by means of an adjusting cylinder 31 shown in dotted lines in FIG. 1. An alternative arrangement is shown in FIG. 4 in the form of a spring 32, which biases the control flap 29 towards a horizontal position. Finally, a control flap 33 is mounted in front of a transverse cutting device, not shown, which comprises a plurality of transverse cutting and grooving stations disposed one above the other.

The mode of operation of the machine illustrated will now be described in more detail below covering the case in which a format is being changed.

In FIG. 1, the cutting and grooving station 13 is situated in the working position and thus with the gap between its cutters in a working plane defined by a sheet 34 of material to be cut and grooved, for example a sheet of corrugated cardboard. The cutting and grooving station 12, by contrast, is situated in a lower, inoperative position. The control flap 23 rests upon a stop 35 and in this position also lies within the working plane, as also does the fixed guide plate 19. Since the guide plate 21 is aligned with the guide plate 19, the control flap 23, guide plates 19 and 21 and the control flap 29 constitute an almost continuous horizontal guide for the sheet 34 in the working plane, so that the cutting and grooving tools of the cutting and grooving station 13 longitudinally cut and groove the sheet in accordance with the positions in which the tools are set laterally of the sheet, which may consist of a number of separate strips side by side. The control flap 26a is situated in an inclined lowered position, and it should be noted here that it may, if desired, be lowered still further to provide better access to the first cutting and grooving station 12.

A change of format, that is a change of the lateral positions in which the sheet is cut and grooved, is prepared for by setting the cutting and grooving tools of the cutting and grooving station 12, which are preferably mounted by quick-release devices on their shafts, to the desired operating spacings. This can be done, for example, by means of an automatic setting device 35a which is shown in dotted lines in FIG. 4 and which can move on transverse rails 36, one of these setting devices being associated with each cutting and grooving station. It is so arranged that the cutting and grooving station enters the setting device when the station reaches its inoperative position.

The change of format is initiated by a rapid transverse cutting device, not shown, which is disposed before, that is to the left of, the control flap 26a, executing a separating cut while just previously, or at the same instant, the pivoting mechanism, not shown, rocks the lever assembly 11 in the direction of arrows 36a (see FIGS. 2 and 3). As a result, the sheet in the region of the first cutting and grooving station 12 is somewhat bulged and raised, whereas in the region of the second cutting and grooving station it is curved downwards somewhat below the working plane. The control flap 29 yields correspondingly. At latest at the instant at which the forward edge 37 of the new section 38 of the sheet has reached the region of the control plate 26a, or with advantage during the making of the transverse separating cut, the control plate 26a is pivoted by means of the adjusting cylinder 28 into its upper working position, so that the support device 25 is now engaged by the control flap 26a and thus automatically lifts the control flap 23 above the control flap 26a. The consequence of this is that the rear end 39 of the cut-off sheet 34 is raised. Since the sheet always has the tendency to continue running in the working plane and the control flap 23 raises the rearward end of the sheet 34, separation of the sections of the cut sheet is attained with ease. At latest at the instant at which the forward edge 37 of the section 38 of the sheet is situated in the region of the cutting and grooving station 12, this station has reached its working position (see FIG. 4), so that the processing of a new section of sheet 38 can be commenced without interruption. The rearward section is still deflected by the guiding surface 21 towards the second cutting and grooving station and is processed by this station, while the cutting and grooving station is nearly or indeed already in the inoperative position. The forward edge 37 of the section 38 of the sheet runs, by contrast, onto the guide surface 20 and subsequently arrives on the control flap 29, which once again has returned into the working plane, after the rearward edge of the sheet 34 has moved onwards. The final operating state with the section 38 extending through the machine after the change of format has been completed is shown in FIG. 5.

Figure 8:
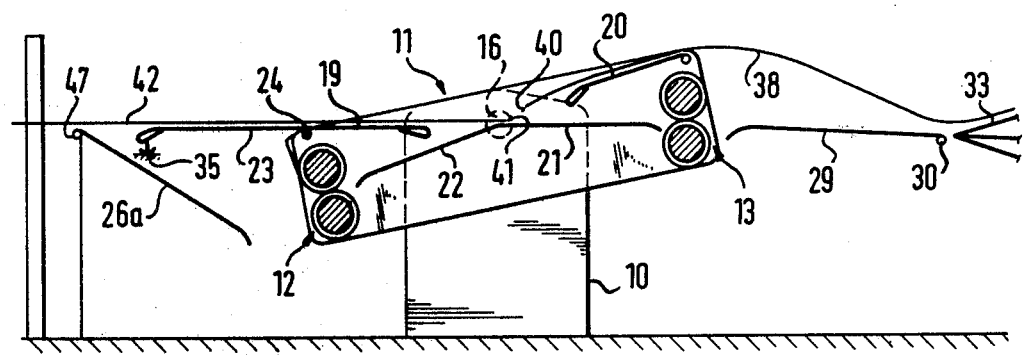

If, starting from the working position of FIG. 5, a change of format is once again to be carried out, it is necessary to pivot back into the working plane the cutting and grooving station 13, which was in the inoperative position and has been set to the desired format, for example by means of a suitable format setting device. This is done once again by means of the pivoting drive, not shown, acting in the direction of arrows 39. The pivoting movement is preferably initiated after the rapid transverse cutting device, not shown, has cut through the sheet 38. The control flap 26a is moved rapidly downwards into an inoperative position (see FIGS. 5-8), so that the control flap 23 bends downwards the section of sheet situated beneath it, while the guide plate 20 above the second cutting and grooving station 13 raises and curves upwards above the working plane the section of sheet associated with it. As can be seen from FIGS. 5-7, the control flap 23 pivots clockwise about its pivot axis, although the cutting and grooving station 12 is descending. If, when the cutting and grooving station 12 was in the working position, the control flap 23 rested upon the stop 26 (FIG. 5), it is already rising in the position shown in FIG. 6, in order finally to come into contact with the stop 35 when it reaches the working plane. Since the flap 26 has been lowered rapidly, and the first cutting and grooving station 12 presses the rearward section of the sheet 38 downwards, the rearward edge 40 of the sheet 38 falls and thus becomes detached from the forward edge 41 of the next section of sheet 42, which has the tendency to continue running forwards in the working plane and thus arrives upon the somewhat inclined control flap 23. The sheet 42 can, after the pivoting movement has been completed, be guided in the working plane by means of the control flap 23, the control plates 19 and 21 and the control flap 29, while the rearward end of the sheet 38 moves away, bulging upwards, along the guide surface 20. The final state succeeding that of FIG. 8 is illustrated once again in FIG. 1.

An important feature of the machine illustrated is firstly the control of the movement of the ends of the sheets, when a change of format occurs, not only by means of control flaps co-operating with one another in a partially coupled manner, but also the moving of the cutting and grooving stations, in cooperative action therewith and also the fixed association of control surfaces between the cutting and grooving stations. The trailing end of a cut-through sheet is either raised (FIGS. 2 and 3) or lowered (FIGS. 6 and 7), while the leading end of the new section of sheet continues to run approximately in the horizontal working plane and is guided in the working plane by already pre-set control flaps and control surfaces through the appropriate cutting and grooving station.

Figure 9:
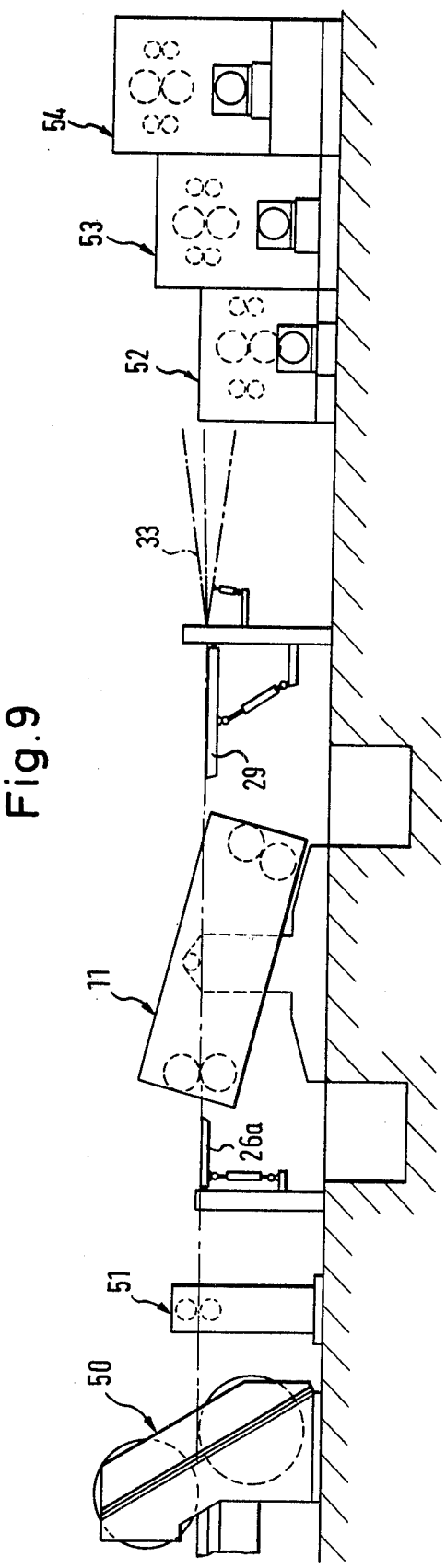
FIG. 9 is a side view of a cutting and grooving plant incorporating the machine shown in FIGS. 1 to 8.

FIG. 9 shows the installation of the cutting and grooving machine shown in FIGS. 1 to 8 in a complete cutting and grooving plant, which follows a corrugated cardboard production machine. Only the last member consisting of a double stand 50 of the production machine is illustrated. The continuous sheet of corrugated cardboard runs from the stand 50 to a transverse cutting device 51. Upstream of the control flap 33, there are three transverse cutting stations 52, 53, 54 staggered at different heights in correspondence with the respective control positions of the control flap 33.

I claim:

1. A machine for longitudinally cutting and grooving continuous sheet material, said machine including a first longitudinal cutting and grooving station, a second longitudinal cutting and grooving station, means for cutting and grooving said sheet material at each of said stations, means for feeding sheet material in a predetermined direction through said machine, means mounting said stations spaced apart in said predetermined direction, whereby, in operation, said sheet material first passes said first station and then passes said second station, means for moving said stations upwardly and downwardly between working and inoperative positions, a device for cutting said continuous sheet material transversely into sections, said working positions of said first station and said second station lying in a common plane and said feed means being operative to feed said sheet material along said common plane, a first guide device for guiding said sheet material associated with said first station, another first guide device for guiding said sheet material associated with said second station, said first guide devices of both said stations being disposed on one side of said common plane when said station with which said guide device is associated is in the working position thereof, a second guide device, means mounting said second guide device between said first station and said second station, said second guide device being directed towards said cutting and grooving means of said second station both when said second station is in said working position thereof and in said inoperative position thereof, a third guide device and means mounting said third guide device between said first station and said second station, said third guide device being directed towards said cutting and grooving means of said first station both when said first station is in the working position thereof and in the inoperative position thereof.

2. A machine as claimed in claim 1, further comprising a fourth guide device, means mounting said fourth guide device for upward and downward movement in a position upstream relative to said predetermined direction of said first station, and means coupling said fourth guide device to said first station whereby said fourth guide device is situated in said common plane when said first station is in said inoperative position thereof.

3. A machine as claimed in claim 2, further comprising a fifth guide device, and means adjustably mounting said fifth guide device upstream of said first station, said adjustable mounting means disposing said fifth guide device in said common plane when said first station is in said working position thereof.

4. A machine as claimed in claim 3, in which said fourth and fifth guide devices partially overlap one another in said predetermined direction.

5. A machine as claimed in claim 1, wherein said first guide device associated with said first station is permanently aligned with said second guide device.

6. A machine as claimed in claim 2, further comprising a two-armed lever assembly, means mounting said first station on one arm of said assembly, means mounting said second station on the other arm of said assembly, means substantially centrally pivotally mounting said two-armed lever assembly and means fixing said first, second and third guide devices to said lever assembly.

7. A machine as claimed in claim 6, further comprising means pivotally attaching said fourth guide device to said lever assembly.

8. A machine as claimed in claim 6, further comprising means pivotally mounting said fifth guide device for movement between a working position in said common plane and a downwardly swung position.

9. A machine as claimed in claim 7, further comprising a first stop associated with said fourth guide device, said first stop being operative to limit pivotal movement of said fourth guide device towards said lever assembly, and a second stop associated with said fourth guide device, said second stop being operative to support a free end of said fourth guide device when said fourth guide device is in said working position thereof.

10. A machine as claimed in claim 9, wherein said fourth guide device rests slidably upon said fifth guide device and said fifth guide device is located beneath said fourth guide device between said first and second stops when said fifth guide device is in said working position thereof.

11. A machine as claimed in claim 1, wherein said working position of each of said stations is situated above said inoperative position thereof.

12. A machine as claimed in claim 1, further comprising a sixth guide device and means adjustably mounting said sixth guide device downstream in said predetermined direction of said second station.

13. A machine as claimed in claim 6, further comprising a drive motor, a common shaft supporting said cutting and grooving means at said first station, a common shaft supporting said cutting and grooving means at said second station and means operatively connecting said drive motor to said common shafts.

14. A machine as claimed in claim 13, wherein said drive motor is a direct current electric motor.

15. A machine as claimed in claim 13, wherein said means operatively connecting said drive motor to said common shafts includes change-of-direction wheels, said wheels having an axis of rotation which coincides with said pivot axis of said lever assembly.

16. A machine as claimed in claim 11, further comprising an automatic setting device associated with each of said stations, said setting device being operative to reset said cutting and grooving means of said station and means mounting said automatic setting device in a location whereby said stations enter said setting devices when said stations are in said inoperative positions thereof.

17. A machine as claimed in claim 3, further comprising means for moving said fifth guide device and means for moving said stations between said working and said inoperative positions thereof, said means for moving said fifth guide device moving said fifth guide device more rapidly than said means for moving said stations moves said stations between said positions.

18. A machine as claimed in claim 3, further comprising hydraulic, pneumatic or electrical means for moving said fourth guide device.

19. A machine as claimed in claim 3, further comprising hydraulic, pneumatic or electrical means for moving said fifth guide device.

20. A machine as claimed in claim 3, wherein said fourth and fifth guide devices each comprise a control flap.

21. A machine as claimed in claim 3, further comprising means for moving said fifth guide device beyond said inoperative position thereof in a direction away from said working position thereof.

22. A machine as claimed in claim 6, further comprising hydraulic, pneumatic or electrical drive means for pivoting said lever assembly to move said first and second stations between said working and said inoperative positions thereof.

23. A machine as claimed in claim 1, further comprising a common shaft at each of said stations and quick-release devices at each of said stations mounting said cutting and grooving means of said station on said common shaft at said station.

24. A machine as claimed in claim 1, wherein the distance between said transverse cutting device and said first station is sufficiently large in relation to the speed at which said feed means feeds said sheet material through said machine for said sheet material to travel from said transverse cutting device to said first station within the time necessary for said first station to move from said inoperative position thereof to said working position thereof.

25. A machine as claimed in claim 1, further comprising independent edge cutting means disposed upstream in relation to said predetermined direction of said first station.

26. A machine as claimed in claim 1, wherein said edge cutting device comprises laser or water-jet cutting means and a suction extraction device associated with said laser or water-jet cutting means.

* * * * *